(12) United States Patent
Chiesl et al.

(10) Patent No.: US 8,207,258 B2
(45) Date of Patent: Jun. 26, 2012

(54) PHYSICALLY CROSSLINKED COPOLYMER COMPOUNDS AND RELATED COMPOSITIONS AND METHODS FOR ELECTROPHORETIC SEPARATION

(75) Inventors: Thomas N. Chiesl, Berkeley, CA (US); Annelise E. Barron, Palo Alto, CA (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 13/230,570

(22) Filed: Sep. 12, 2011

(65) Prior Publication Data

US 2012/0000780 A1      Jan. 5, 2012

Related U.S. Application Data

(62) Division of application No. 11/803,278, filed on May 14, 2007, now Pat. No. 8,017,682.

(60) Provisional application No. 60/799,883, filed on May 12, 2006.

(51) Int. Cl.
*C08F 120/58* (2006.01)
(52) U.S. Cl. ............. 524/555; 526/303.1; 526/304; 526/307.2; 526/307.5

(58) Field of Classification Search .............. 524/555; 526/303.1, 304, 307.2, 307.5
See application file for complete search history.

(56) References Cited

U.S. PATENT DOCUMENTS

| | | |
|---|---|---|
| 6,464,850 B1 | 10/2002 | Zhang et al. |
| 6,787,016 B2 | 9/2004 | Tan et al. |
| 2002/0029968 A1 | 3/2002 | Tan et al. |

OTHER PUBLICATIONS

Chiesel, et al. Analytical Chemistry (2005), 77(3), 772-779.
Pabon, et al. Journal of Applied Polymer Science (2004), 91(2), 916-924.
Jimenez-Regalado, et al. Macromolecular Research (2004), 12(5), 451-458.
Chiesl, et al. Enhanced DNA Separations in Microchannels Via a Novel Polymer Architecture: Physically Crosslinked Polymer Solutions. Poster Session: American Electrophoresis Society-2005 Annual Meeting: Poster #294d, Nov. 1, 2005, abstract only.
Kan et al. DNA sequencing and genotyping in miniaturized electrophoresis systems. Electrophoresis, 2004, vol. 25, pp. 3564-3588, p. 3576, col. 2 through p. 3577, col. 1.

*Primary Examiner* — Bernard Lipman
(74) *Attorney, Agent, or Firm* — Reinhart Boerner Van Deuren s.c.

(57) ABSTRACT

Linear acrylamide copolymer compounds which can comprise monomeric components comprising at least one N-substituted moiety capable of physical cross-linking, and related compositions and methods of use.

14 Claims, 10 Drawing Sheets

Figure 1A
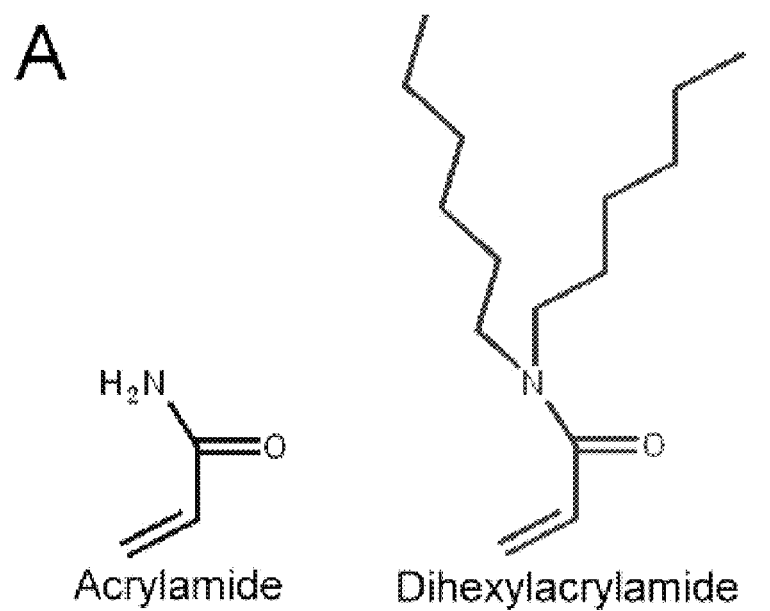
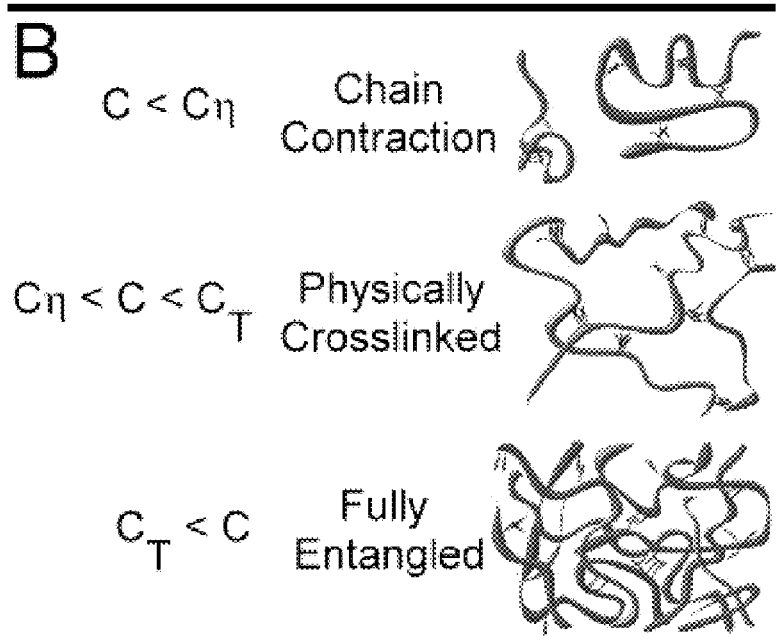
Figure 1B

PHYSICALLY CROSSLINKED COPOLYMER COMPOUNDS AND RELATED COMPOSITIONS AND METHODS FOR ELECTROPHORETIC SEPARATION

This application is a divisional of and claims priority benefit from application Ser. No. 11/803,278 filed May 14, 2007, now issued as U.S. Pat. No. 8,017,682, which claimed priority benefit from application Ser. No. 60/799,883 filed May 12, 2006, each of which are incorporated herein by reference.

This invention was made with government support under grant number F49620-01-1-0401 awarded by the Air Force Office of Scientific Research and grant number EEC0118025 awarded by the National Science Foundation. The government has certain rights in the invention.

BACKGROUND OF THE INVENTION

The sequencing of the human genome was in part accomplished through engineering achievements in polymer science, and followed a paradigm shift in electrophoresis technology from slab gels to capillary electrophoresis. This shift is continuing with a movement towards microfluidic chips, and for these miniaturized platforms, there is a need for high-performance biomolecule separation media that can be loaded into microdevices with ever-decreasing footprints. For high-performance genetic analysis on chips, a fresh "gel" is required for each analysis. Covalently crosslinked polyacrylamide gels, once the gold standard for electrophoretic DNA separations, are monolithic and cannot be loaded and reloaded into microchannels, while in vitro polymerization of acrylamide in confined microchannels yields poor separation media.

To address this problem, various "replaceable" linear polymer and copolymer solutions have been developed as DNA separation media for capillary and microchip electrophoresis systems. Among the more notable approaches taken to improve microchannel DNA separations using pre-formed polymers are the use of entangled solutions of high-molar mass linear polymers (particularly polyacrylamide and polydimethylacrylamide), as well as novel polymers with diverse non-linear architectures and properties (e.g., thermo-responsive linear copolymer networks, branched copolymers, and sparsely crosslinked nanogel solutions). While results have been encouraging, the search continues in the art for new polymeric compounds and improved separation.

SUMMARY OF THE INVENTION

In light of the foregoing, it is an object of the present invention to provide a class of linear copolymeric compounds, related compositions, methods and apparatus structures, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide copolymer compounds, of appropriate viscosities for electrophoretic separation, which can be loaded into capillaries and microfluidic vices under moderate pressures.

It can be another object of the present invention to provide such copolymer compounds, varied by monomeric structure and percentage, depending on a particular separation or end-use application.

It can be another object of the present invention to provide a copolymer design permitting incorporation of monomeric components otherwise known in the art to impart particular structural or functional characteristics to the resulting copolymer.

It can be another object of the present invention, in conjunction with one or more of the preceding objectives, to provide related compositions, methods and/or apparatus structures to enhance DNA/RNA separations, as compared to homopolymers of the prior art.

It can be another object of the present invention, in conjunction with one or more of the preceding objectives, to provide related compositions, methods, and/or apparatus structures to enhance protein separation as compared to homopolymers of the prior art.

Other objects, features, benefits and advantages of the present invention will be apparent from this summary and the following descriptions of certain embodiments, and will be readily apparent to those skilled in the art having knowledge of various copolymeric compounds, their preparation, and use in related separation methods and systems. Such objects, features, benefits and advantages will be apparent from the above as taken into conjunction with the accompanying examples, data, figures and all reasonable inferences to be drawn therefrom, alone or with consideration of the references incorporated herein.

In part, the present invention can be directed to linear acrylamide copolymer. Such a compound can comprise a plurality of one or more first monomeric components of a formula $CH_2C(R_1)C(O)NR_1'R_1''$ where $R_1$ can be selected from H and methyl moieties; and $R_1'$ and $R_1''$ can be independently selected from H, $C_1$ to about $C_4$ linear alkyl moieties, $C_1$ to about $C_4$ substituted linear alkyl moieties, $C_1$ to about $C_4$ branched alkyl moieties, and $C_1$ to about $C_4$ substituted branched alkyl moieties; and a plurality of one or more second monomeric components of a formula $CH_2C(R_2)C(O)NR_2'R_2''$, where $R_2$ can be selected from H and methyl moieties; and $R_2'$ and $R_2''$ can be independently selected from H, $C_1$ to about $C_{24}$ linear alkyl moieties and $C_1$ to about $C_{24}$ branched alkyl moieties, providing at least one of $R_2'$ and $R_2''$ is at least about $C_6$. Whether a random or block copolymer, in certain embodiments, $R_1'$ can be H and $R_1''$ can comprise a $C_2$ or $C_3$ alkyl moiety. Likewise, in one or more such embodiments, $R_2'$ can be H or an about $C_6$ to about $C_{10}$ alkyl moiety and $R_2''$ can be an about $C_6$ to about $C_{10}$ alkyl moiety.

With respect to a first monomeric component, any combination of $R_1'$ and $R_1''$ is limited only by hydrophilic character imparted to such a monomer, such that a first monomeric component and a resulting copolymer compound are at least partially soluble in an aqueous medium. Accordingly, $R_1'$ can further comprise substituents (e.g., without limitation, hydroxy, amino, etc.) contributing to such hydrophilic character and function. Likewise, with respect to a second monomeric component, any combination of $R_2'$ and $R_2''$ (either one or both of which as can also be substituted) is limited only by hydrophobic character imparted to such a monomer and ability to, either intra- or intermolecularly, physically interact and/or associate with other such moieties to an extend at least partially sufficient to provide a functional effect of the sort described more fully below.

In certain embodiments, one or more such second monomeric components, depending on identity of $R_2'$ and $R_2''$, can comprise up to about 5.0 mole percent of a particular copolymer compound. Without limitation, such a monomeric component can comprise a mole percent ranging from about 0.1 . . . about 0.5 . . . about 1.0 . . . about 2.5 . . . about 3.0, . . . or about 4.5 mole percent.

Regardless, the resulting copolymer can be present in a composition comprising a fluid medium, of the sort described herein, in a concentration at a weight percent ranging up to about 5.0 weight percent or greater. Alternatively, as described below, depending upon identity of such first monomeric component(s) and second monomeric component(s), end-use application, a copolymer concentration can range from about or below a concentration at which $R_2'$ and/or $R_2''$ tend to interact or associate intramolecularly to about a concentration at which such moieties begin to or interact or associate intermolecularly to provide at least a partially physically cross-linked system of such copolymer(s), or to about or greater than a concentration at which such moieties and the corresponding second monomeric component(s) interact or associate intermolecularly. As described below, various copolymer concentrations, numerical values and ranges can be determined and are limited only by choice of monomeric component(s) and corresponding moieties.

In certain non-limiting embodiments, representative of many other compounds of this invention, a copolymer, whether random or block, can comprise acrylamide and dihexylacrylamide (DHA) monomers. The molar mass of such a compound is limited only by synthetic technique and available starting materials, using procedures of the sort described herein. A molar mass ranging up to about 12 million g/mole can be obtained. Other copolymer compounds are available and can be prepared, limited only by end-use application. Regardless, a DHA monomeric component can range up to about 5.0 mole percent, while in other embodiments ranging from about 0.13 to about 0.43 mole percent of the copolymer. Such a compound can be present in a suitable fluid medium at a concentration ranging up to about 5.0 weight percent. In certain other embodiments, the copolymer concentration can range from about 2.5 weight percent and about 4.5 weight percent.

Unless otherwise indicated, all numbers expressing properties such as mole percent, molar mass, weight percent and the like, used herein, are to be understood as being modified in all instances by the term "about". Accordingly, unless indicated to the contrary, the numerical parameters herein are approximations that can vary depending upon desired compound or system properties or results to be achieved using any method relating thereto, such mole percents, molar masses and weight percents as can be varied by those skilled in the art made aware of this invention.

With respect to any of the compounds, compositions, methods and/or apparatus of the present invention, the copolymers can suitably comprise, consist of or consist essentially of any of the aforementioned monomers, regardless of the weight percent of any such monomer in any corresponding copolymer. Each such copolymer compound or monomeric component thereof is compositionally distinguishable, characteristically contrasted and can be practiced in conjunction with the present invention separate and apart from another. Accordingly, it should also be understood that inventive compounds, compositions, methods and/or apparatus, as illustratively disclosed herein, can be practiced or utilized in the absence of any one compound, monomeric component and/or step which may or may not be disclosed, referenced or inferred herein, the absence of which may not be specifically disclosed, referenced or inferred herein.

In part, the present invention can also be directed to a composition comprising one or more copolymers of the sort described above, each such copolymer comprising first monomeric component(s) and second monomeric component(s), in a fluid medium. Such a composition can comprise a copolymer with a molar mass up to about 1 million g/mole or greater. As described above, such a composition can comprise a copolymer of any first monomeric component(s) and any second monomeric component(s) of the sort described herein. (See, e.g., FIG. 1) Without regard to molar mass, such a copolymer can comprise up to about 95 weight percent or more of first monomeric component(s). Without limitation as to any one monomeric or weight percent ratio, such a composition can be at least partially soluble in an aqueous medium, at room temperature. Likewise, such a composition can be provided in conjunction with a microchannel electrophoresis capillary or microfluidic component.

The present invention can also be directed to a method of using a copolymer compound or composition of the sort described above for separation of any type of single- or double-stranded DNA or RNA fragments. Without regard to any particular order, such a method can comprise providing a copolymer compound of this invention or in an aqueous medium, or such a composition as can further comprise a DNA/RNA sequencing buffer; introducing such a compound/composition to either a microchannel DNA/RNA electrophoresis capillary or a microfluidic DNA/RNA sequencing chip, and contacting a mixture of DNA and/or RNA components with the compound/composition, at an applied voltage and for a time sufficient for electrophoretic separation of the mixture. Without limitation, such copolymers can comprise greater than about 95 weight percent of first monomeric component(s). Regardless, copolymers of this invention can separate DNA sequences (e.g., single-stranded DNA) of lengths from about 50 to about 850 bases. Non-limiting examples of such a separation/sequencing methodology are provided below.

In part, this invention can also be directed to a method of using a hydrophobic monomer moiety to effect nucleic acid separations in a polymer network based on or comprising a poly(acrylamide) copolymer. Such a method can comprise providing a separation medium comprising a copolymer comprising one or more first monomeric components and one or more second monomeric components of the sort described above, a second monomeric component comprising moieties $R_2'$ and $R_2''$, also as described above, where $R_2'$ and/or $R_2''$ is at least partially sufficient to provide the second monomeric component(s) hydrophobic character, such a copolymer at a concentration in the medium, having a molar mass and comprising a first mole percent of second monomeric component(s); introducing such a medium to either a microchannel DNA or RNA electrophoresis capillary or microfluidic DNA/RNA sequencing or genotyping chip; and contacting a mixture of DNA and/or RNA components with the medium, at an applied voltage and for a time sufficient for electrophoretic separation of the mixture. Without limitation, such copolymers can comprise up to about five mole percent or more of second monomeric component(s), such copolymers as can be compared functionally and/or compositionally to linear, unmodified, hydrophilic acrylamide homopolymer.

For a given mole percent of second monomeric component(s), such a copolymer can have a concentration adjusted for separation of a particular DNA/RNA mixture. In certain embodiments, the concentration can be at or about which interaction of $R_2'$ and/or $R_2''$ is substantially intermolecular. At such a concentration, depending upon second monomer identity and/or a particular DNA/RNA mixture, effective separation can be achieved over a mole percentage range of the monomeric component. Alternatively, such a copolymer concentration can be below that sufficient for substantial intermolecular interaction of $R_2'$ and/or $R_2''$. In such embodiments, separation time can be decreased with increasing mole percent of second monomeric component(s), substantially without loss of resolution. Regardless, by adjusting copolymer concentration and/or second monomeric component(s) mole percentage, sequence lengths ranging from about 50 to about 850 base-pairs can be separated.

As demonstrated below, choice and incorporation of such hydrophobic moieties can provide a medium of sufficient viscosity for a particular separation. However, application of shear force pressures can be used effectively to lower viscosity and facilitate microchannel loading. In certain embodiments, loading can be preceded by application of a coating component known in the art to reduce osmotic flow. In certain such embodiments, such a component can comprise poly-N-(hydroxyethylacrylamide). In certain other embodiments, such a component can be incorporated into a copolymer as a first monomeric component, for comparable effect.

As can relate to the preceding, this invention can also be directed to a microchannel DNA electrophoresis apparatus. Such an apparatus can comprise a substrate and a copolymeric compound thereon (e.g., without limitation, adsorbed on, coupled to and/or connected therewith), with such a substrate selected from a micron-dimensioned capillary and a microfluidic sequencing chip. Without limitation to microchannel substrate or apparatus configuration, such a copolymer can comprise, in certain embodiments, up to about 95 weight percent acrylamide. While various copolymers of this invention have demonstrated wall-coating performance, such compounds can also be used in conjunction or combination with other types of capillary or microchannel wall coating materials known in the art.

DETAILED DESCRIPTIONS OF CERTAIN EMBODIMENTS

As discussed more fully below, in conjunction with certain non-limiting embodiments, this invention can be directed to DNA separation media (for, e.g., microchip electrophoresis), and/or physically crosslinked block copolymer networks thereof, which can provide rapid (e.g., <4.5 min) and remarkably enhanced resolution of DNA in a size range critical for genotyping. For instance, linear poly(acrylamide-co-dihexylacrylamide) (LPA-co-DHA) comprising as little as 0.13 mol % dihexylacrylamide yields substantially improved electrophoretic DNA separations compared to matched molar mass linear polyacrylamide. Single-molecule videomicroscopic images of DNA electrophoresis reveal novel chain dynamics in LPA-co-DHA matrices, resembling inch-worm movement, which can be attributed to increased DNA resolution. Substantial improvements in DNA peak separation are obtained, in particular, in LPA-co-DHA solutions at copolymer concentrations near the interchain entanglement threshold. Higher polymer concentrations can be used effectively to yield enhanced separations for small DNA molecules (e.g., <about 120 base-pairs). Hydrophobically crosslinked networks, in accordance with this invention, offer advantages over conventional linear polymers based on enhanced separation performance (or speed) and over chemically crosslinked gels, allowing facile microchannel loading.

The copolymer compounds and compositions, via microchannel electrophoresis, are able to separate single-stranded DNA (ssDNA) and double-stranded DNA (dsDNA) with much higher selectivity and resolution than conventional polymer/copolymer media. This class of copolymers can be tailored (e.g., with molar mass, hydrophobic moiety, hydrophobic mol %, and copolymer concentration) to provide faster separations than LPA systems of the prior art, with equal resolution or provide remarkably improved separation performance over LPA.

In addition, unlike covalently linked cross-linked polymer networks, the present copolymer compounds/compositions can be loaded into capillaries and microfluidic devices for high-performance and high-throughput separations in an automated fashion. Preliminary data has shown that such copolymers can be made to self-coat. This is important because no additional time or materials are needed to reduce electroosmotic flow or reduce analyte-wall interactions which are deleterious to DNA separations. Furthermore, as would be understood by those in the art made aware of this invention, monomer units can be included within these copolymers to induce a thermally induced volume phase transition, which could aid in loading of these copolymer networks into microfluidic devices. See, e.g., co-pending application Ser. No. 11/174,082, filed Jun. 30, 2005 the entirety of which is incorporated herein by reference.

Figure 1C:
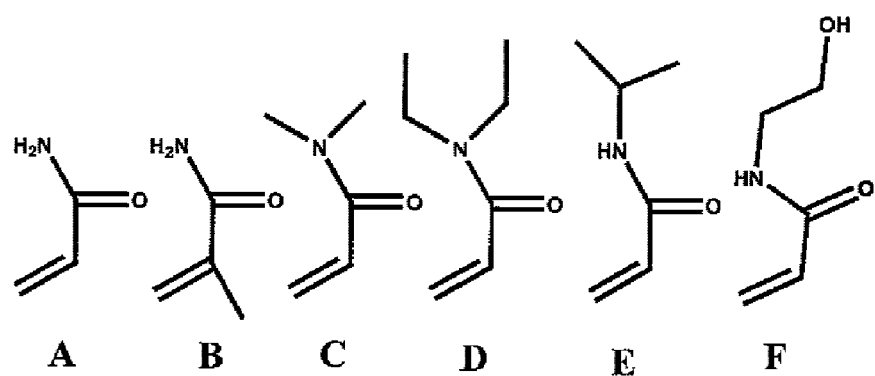
FIG. 1. Schematic illustration of monomer structures, and copolymer conformations in different concentration regimes. (A) Hydrophilic acrylamide is used to create the majority of the polymer backbone. Dihexylacrylamide becomes incorporated in randomly distributed blocks within the copolymer. (B) Different conformational states for physically crosslinked copolymers. At low polymer concentrations, dihexylacrylamide forms intramolecular associations and LPA-co-DHAs exist in a state of chain contraction. At moderate concentrations, dihexylacrylamide forms intermolecular bonds and leads to the formation of a physically crosslinked network. At higher concentrations (greater than $C_e$, the entanglement concentration for unmodified polymers) both LPA and LPA-co-DHAs exist as fully entangled networks, while only the LPA-co-DHAs are physically crosslinked.
Figure 1D:
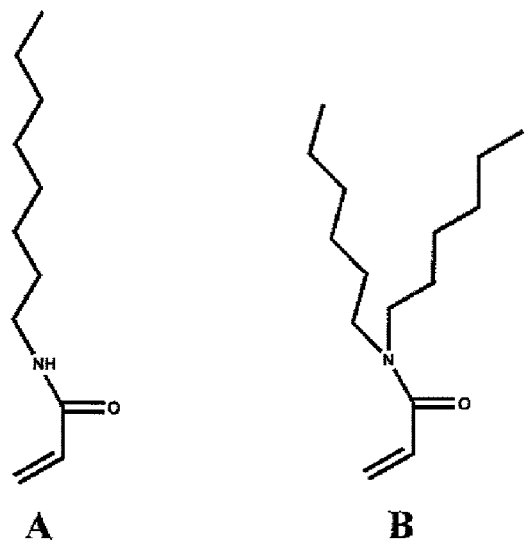

With reference to the preceding discussion, such copolymers can comprise a majority of first monomeric or hydrophilic components and a minority of second monomeric or hydrophobic components. As understood in the art, first or hydrophilic monomers include but are not limited to acrylamide, methacrylamide, dimethylacrylamide, diethylacrylamide, isopropylacrylamide, hydroxyethylacrylamide and combinations thereof and can be randomly distributed among blocks (e.g., 1 to about 10 units) of second or hydrophobic monomers including but no limited to alkyl- and dialyklacrylamides and combinations thereof. Structures for representative first hydrophilic acrylamide based monomers are shown in FIGS. 1A and 1C and two examples of hydrophobic acrylamide based monomers are shown in FIGS. 1A and 1D. Accordingly, other hydrophobic alkylacrylamide monomers can include: hexyl-, heptyl-, octyl, nonyl-, decyl-, undecyl-, dodecyl-acrylamides and hexyl-, heptyl-, octyl, nonyl-, decyl-, undecyl-, and dodecyl-methacrylamides. Hydrophobic dialkylacrylamide monomers can include: dihexyl-, diheptyl-, dioctyl, dinonyl-, didecyl-, diundecyl-, didodecyl-acrylamides and dihexyl-, diheptyl-, dioctyl, dinonyl-, didecyl-, diundecyl-, and didodecyl-methacrylamides.

Any copolymer of this invention can be synthesized containing about ~95% or more of one, or any combination of first, hydrophilic monomers and about 5% or less of a second hydrophobic monomer or mixture of hydrophobic monomers to provide a physically entangled cross-linked network capable of high-performance DNA separation. Providing some amount of hydrophobic monomer is present (e.g., as little as about 0.1 mole % or less, as has been demonstrated) the amount or type of hydrophobic monomer can be varied to optimize DNA separation performance. Inclusion of dimethyl-, diethyl-, and isopropyl-acrylamide can provide a copolymer with a thermally induced phase transition. Inclusion of hydroxyethylacrylamide in addition to one or more second, hydrophobic monomers can be used to provide, in the context of this invention, a self-coating copolymer; that is one that does not require any covalent linking chemistry to an apparatus surface. Surface coating is desirable, as it reduces unwanted electrosmotic flow during electrophoresis and can reduce analyte-wall interactions which are detrimental to high-performance microchannel electrophoresis separations. Additionally, various hydrophobic moieties of such a copolymer may aid in the binding of the copolymer to surfaces to enhance the effects of a surface bound polymer. For instance, preliminary data has shown that the inclusion of 7 mol % hydroxyethylacrylamide into a copolymer of 1.4 million g/mol molar mass can reduce the electroosmotic flow in a fused silica capillary to an average value of 6.2*10−10 m2/V−s, while a 3.3 mol % hydroxyethylacrylamide copolymer content with molar mass of 1.1 million g/mol reduces electroosmotic flow to 2.1*10−9 m 2/V−s.

Regardless of copolymer composition hydrophobically crosslinked networks can be formed by the physical association of N-alkyl moieties present in small blocks in such overall water-soluble, acrylamide-based copolymers with predominantly hydrophilic backbones and small (<5 mol %) amounts of the hydrophobically modified co-monomers. Representative copolymers comprising acrylamide and N,N-dihexylacrylamide (LPA-co-DHAs), with various amounts of the hydrophobic co-monomers, illustrate this class of physically crosslinked matrices for microchannel electrophoretic separations of DNA.

In LPA-co-DHAs synthesized by micellar polymerization, the hydrophilic acrylamide monomers form the bulk of the polymer backbone while small blocks of hydrophobic dihexylacrylamide monomers can form either intramolecular or intermolecular physical entanglements, dependent on the concentration and the molar mass of the copolymer. These different copolymer conformation/association regimes are marked by two concentration values: $C_\eta$, a concentration similar in meaning to c* (the polymer coil overlap threshold) in unmodified polymers, and $C_T$, the concentration at which "elastic" behavior becomes dominant for unmodified polymer chains in solution, analogous to $C_e$ in unmodified polymers. Typical intra and inter-chain conformations and interactions in these different regimes are highly relevant to their use as DNA separation media, and are illustrated in FIG. 1B.

Previous studies have shown that $C_\eta$ exhibits a strong dependence on the molecular weight of the copolymers, but is independent of the block length and the mole percentage (mol %) of the hydrophobic moiety. The concentration regime between $C_\eta$ and $C_T$ is typically marked by a sharp linear increase in solution viscosity, depending on the mol % hydrophobe and the average dihexylacrylamide block length. At concentrations below $C_\eta$, LPA-co-DHA polymers are in a relatively dilute, unentangled state, and dihexylacrylamide units tend to form intramolecular bonds within the polymer chain. Polymer chain contraction occurs because of these intramolecular associations, resulting in a slightly lower solution viscosity relative to an unmodified LPA solution with matched LPA molar mass and concentration.

As copolymer concentration is increased beyond $C_\eta$, individual polymer molecules begin to interact and entangle with each other, and the dihexylacrylamide blocks within the copolymers associate intermolecularly via hydrophobic bonding. Alternatively, homopolymer networks without hydrophobic blocks will remain mostly disassociated and have a loose network structure in this concentration range. As polymer or copolymer concentration is increased to values near $C_T$, individual polymer or copolymer coils begin to truly overlap in solution and form an infinite entangled network. The LPA-co-DHA copolymer system forms a more robust network near this concentration due to the hydrophobic associations of the dihexylacrylamides that physically crosslink the network. As discussed below, the concentration $C_T$ appears to be a consideration for enhanced DNA separations in physically crosslinked polymer solutions.

As polymer or copolymer concentration is further increased, the scaling of the viscosity is dominated by the effects of increased polymer concentration. At these higher concentrations LPA and LPA-co-DHA polymer solution viscosities scale similarly and have reptation-dominated dynamics. A plot of zero-shear viscosity vs. polymer concentration can be seen in FIG. 2, where the viscosities of matched molar mass (1.3 million g/mol) LPA solutions are compared to LPA-co-DHA comprising 0.23 mol % dihexylacrylamide. Because the copolymers presented in this work have minimal amounts of dihexylacrylamide (compared to those reported in the literature) the viscosity differences in the region between $C_\eta$ and $C_T$, while appreciable, are not as well pronounced. $C_\eta$ and $C_T$ were determined to be approximately 0.15 wt % and 2.5 wt %, respectively. In addition to $C_\eta$ a concentration threshold designated in FIG. 2 as $C_{ES}$ (ES for equal separation) is delineated at ~4.6 wt % copolymer; and is correlated to similar polymer/copolymer network strengths (discussed below).

With regard to rheological behavior, a major advantage to physically crosslinked polymer solutions, such as LPA-co-DHAs, is that physical crosslinks can be disassociated under applied shear, such as during pressurized microchannel loading. Moreover, the entangled copolymer network shear-thins in solution as chains become forcefully disentangled from each other and orient in the flow field, so that the solution viscosity decreases by several orders of magnitude under moderate applied shear (such as those typically used for the pressurized loading of microchannels). This behavior is unlike that of covalently crosslinked networks, which are monolithic, do not shear-thin and are extremely difficult, if not impossible, to load into a microchannel. Upon cessation of shear, LPA-co-DHA copolymer chains relax and the dihexylacrylamide units will re-associate, thus returning the network to a physically crosslinked state.

Electrophoresis of DNA in matrices with polymer concentrations in each of these regimes yields interesting DNA separation performance results, which can be correlated with the different polymer network architectures. Results of microchannel electrophoresis separations of mixtures of DNA molecules with different chain lengths ("DNA ladders") performed in LPA and LPA-co-DHA solutions at 3 wt %, a concentration near $C_T$ were compared to study the ramifications of hydrophobic crosslinking. At this concentration, the block copolymer network is both highly (though reversibly) crosslinked and physically entangled. An LPA-co-DHA copolymer with a weight-average molar mass of 1.3 million g/mol has approximately 18,000 repeat units. The copolymer with the smallest dihexylacrylamide content studied (0.13 mol %), has on average 20 dihexylacrylamide units spread among 4 or 5 blocks, which are available to physically crosslink a given polymer chain with neighboring copolymer chains.

Figure 4:
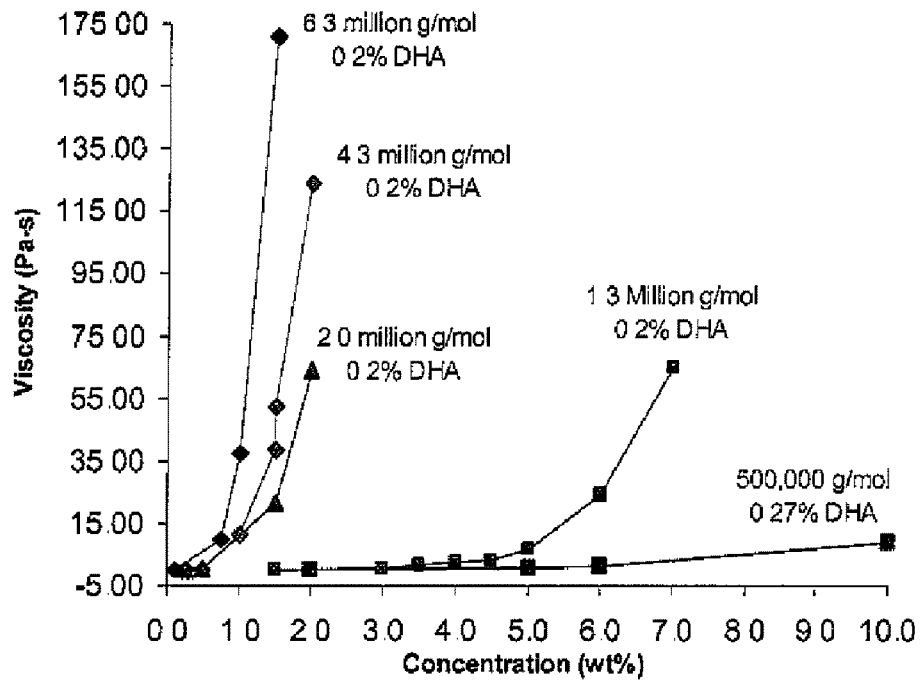
FIG. 4. Effect of copolymer molar mass on the viscosity of polymer solutions containing similar hydrophobic mol % incorporation. Increasing the molar mass of the copolymer decreases the overlap threshold concentration and entanglement concentration of the copolymer and increases the viscosity at equal wt % copolymer.

This critical concentration, $C_\eta$, is independent of the hydrophobic block length, of the concentration of hydrophobic monomer in the copolymer, and the length of the alkyl side chain, and instead is dependent on the molecular weight of the copolymer only (as seen in FIG. 4). Increasing the copolymer molecular weight decreases the $C_\eta$, and creates a range of the region of hydrophobic association that can be tailored to concentration.

Figure 3A:
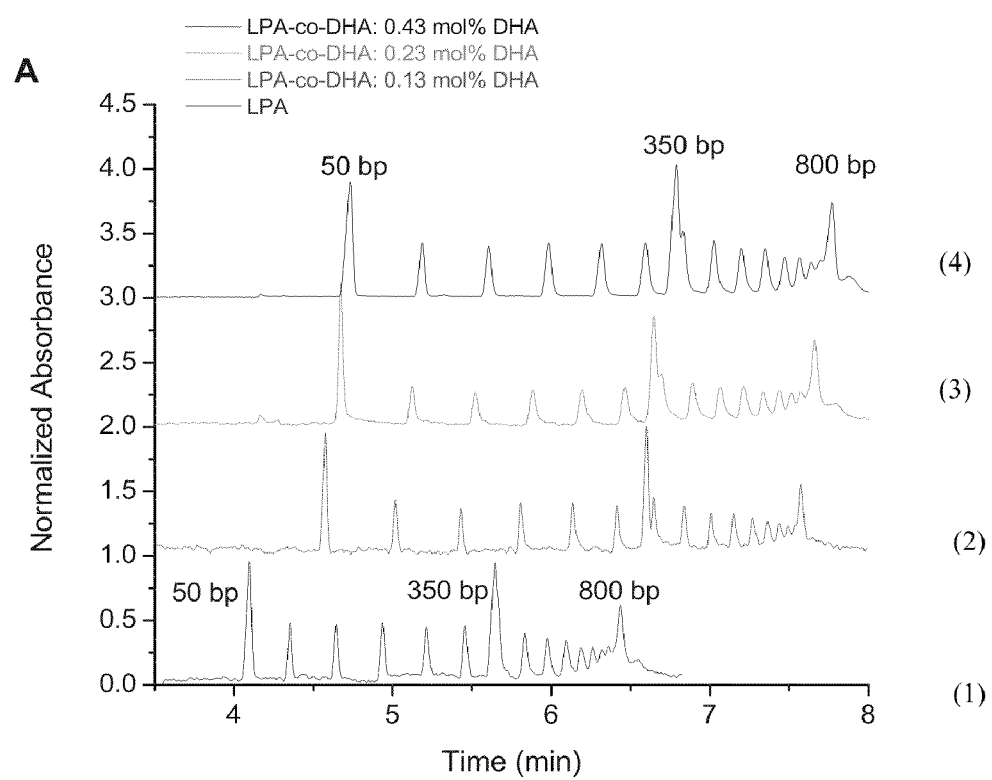
FIG. 3. Separation of a 50-bp DNA ladder in polymer solutions in the concentration range of increased separation performance. The polymers shown are all ~1.3 million g/mol and were used at 3 wt % concentrations. Data for DNA migration in the unmodified polymer network, based on LPA, are shown as plot (1). LPA-co-DHAs have dihexylacrylamide content of 0.13 mol % (plot 2), 0.23 mol % (plot 3), and 0.43 mol % (plot 4). Normalized raw data are shown in FIG. 3A, while in FIG. 3B the peaks in the LPA-co-DHAs have been time shifted such that the first DNA peaks (50 bp) are aligned with the first peak in the LPA electropherogram, to more easily show the differences in peak selectivity and resolution.
Figure 3:
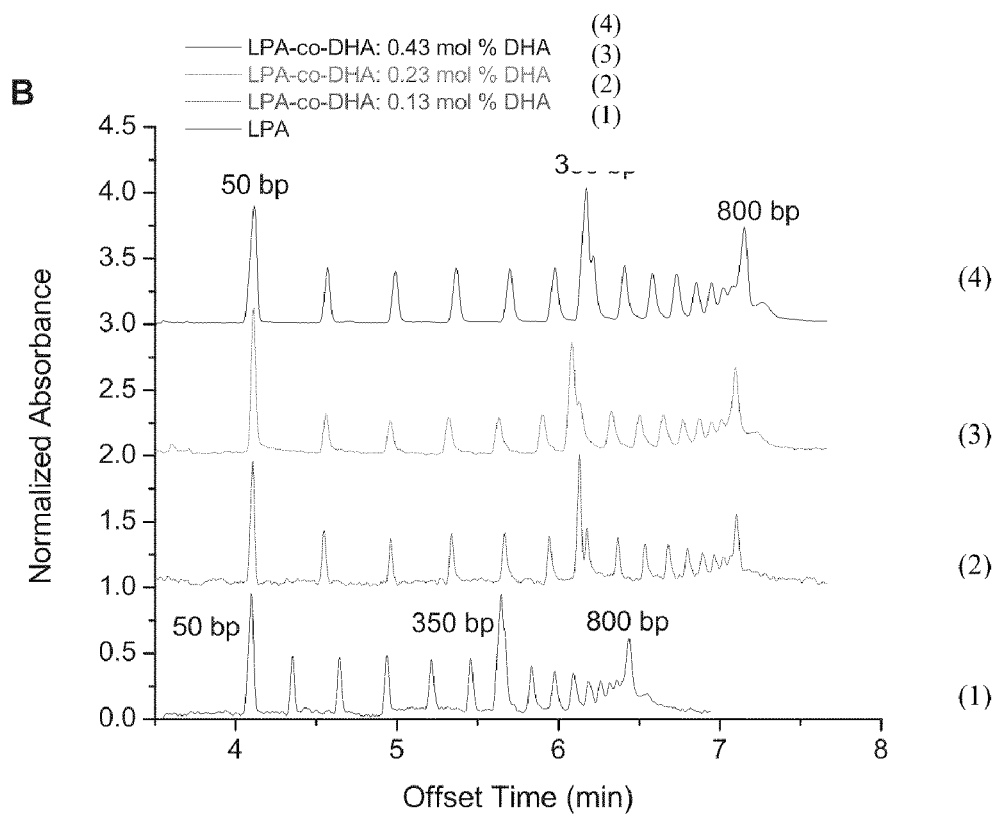

At copolymer concentrations above $C_\eta$, the viscosity increases linearly to a viscosity of 4 Pa-sec while the unmodified polymer network retains a relatively low viscosity until it increases exponentially to 0.95 Pa-sec at 4.5 wt % as seen in FIG. 3. When the concentration is further increased past $C_T$ the copolymer solution viscosity scales similarly to that of LPA. Increasing the concentration above $C_\eta$ causes the hydrophobic units of the copolymer to switch from forming mostly intramolecular bonds to forming predominately intermolecular bonds. At this concentration range, the network becomes physically (hydrophobically) cross-linked only for acrylamide-co-alkylacrylamide copolymers. A single polymer chain may form many cross-links with a neighboring chain or many cross-links with many neighboring chains thus creating a very stable network with different pore sizes. Homopolymer (polyacrylamide) networks will remain mostly unassociated and have a loose network structure in this concentration range.

Figure 5:
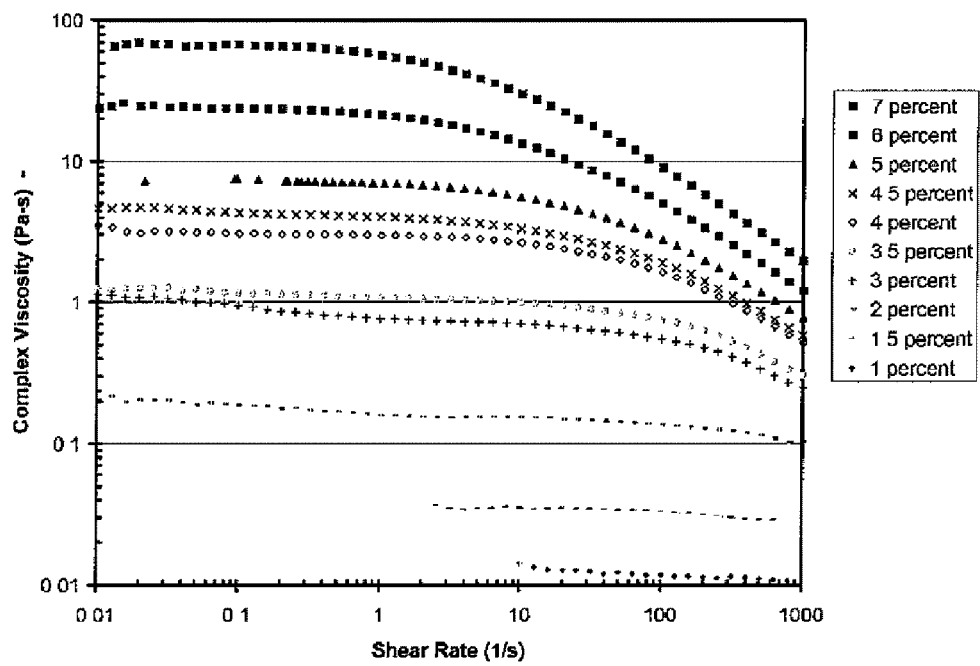
FIG. 5. Shear thinning nature of poly(acrylamide-co-dihexylacrylamides). Copolymer molar mass is 1.3 million g/mol and contains 0.23 mol % dihexylacrylamide. Data is shown for concentrations ranging between 1 and 7% wt.

These copolymer networks, like many other polymer solutions, show shear thinning behavior in solution. This means that under modest applied shear rates the solution viscosity dramatically decreases by several orders of magnitude and the loading time of polymer solutions is greatly reduced. This behavior is unlike that observed for a covalently cross-linked network, which will not shear thin and is extremely difficult or impossible to load into a microchannel. FIG. 5 presents viscosity vs. shear rate data for solutions of LPA-co-DHA copolymer with molar mass of 1.3 million g/mol and 0.23% mol dihexylacrylamide. Several concentrations of polymer in buffer are shown, with the shear thinning behavior. Upon removal of shear, the polymer chains will relax and the dihexylacrylamide units will reform their physical cross-links, thus returning the copolymer to its original form.

It is through these physical cross-links that the DNA separation performance can be enhanced relative to what is obtained with conventional entangled polymer solutions. The polymer network is physically strengthened and gives better separation performance. These polymer solutions also have an advantage over covalently cross-linked gels, because the physical cross-links can be broken (via applied shear and other methods) and reformed without damaging the polymer. In particular, under applied shear, solutions of these polymers can flow into microchannels (such as capillaries or microfluidic devices) and upon removal of the shear force the hydrophobic units will re-associate into a cross-linked copolymer solution As demonstrated below, at concentrations of polymer less than $C_\eta$ the separation time required for DNA is less than in the unmodified polymers (unique to this class of polymers) and the separation performance in a hydrophobically modified polyacrylamide solution is comparable to what is obtained with the unmodified homopolymer. At polymer concentrations fairly greater than $C_E$, DNA separation performance in a hydrophobically modified polyacrylamide is comparable to the unmodified homopolymer, except for small sized DNA (<120 base pairs) where modified copolymers enhance DNA separations during microchannel electrophoresis. DNA separations performed in physically cross-linked polymer solutions at concentrations between $C_\eta$ and $C_T$ are far superior to those performed in unmodified, non-physically cross-linked polymer matrices (unique to this class of polymers). These separation mechanisms are novel and have not been previously observed in polymer based separation media for DNA separations by electrophoresis.

FIG. 3 presents several capillary electropherograms of DNA separations obtained under identical conditions through LPA-co-DHA copolymer solutions and a matched-molar mass LPA homopolymer dissolved at 3 wt %. In both panels of the figure, the data have been normalized and offset for clarity, and in FIG. 3B the peaks are time-shifted to clarify the effect of copolymer content on DNA resolution (see figure caption). Polymer concentration and the extent of interchain polymer entanglements appear important: the separation of DNA molecules in the 50 base-pair ladder in 3.0 wt % LPA is substantially improved relative to what was seen for lower concentrations (e.g., 1.5 wt % LPA; see examples 9-10), with better peak spacing and sharper peak shapes, to about 650 bases, with the first peak eluting at 4 min (data not shown). Separations performed in LPA-co-DHA networks yield slower separations than in an LPA homopolymer network at the same concentration. As dihexylacrylamide monomer content (and hydrophobicity) increases, the migration time of the DNA becomes slightly longer, as seen in FIG. 3A. However, the ability of the LPA-co-DHA network to separate DNA of differing sizes is significantly better than in the homopolymer network, and is nearly independent of dihexylacrylamide content as seen in FIG. 3B. In the LPA-co-DHAs, DNA peak spacing is particularly improved for DNA smaller than 450 bases, and is moderately improved for DNA with sizes greater than 450 bases. Peak efficiencies for both (co)polymer systems are comparable at ~300,000 plates/meter; however, the peak selectivity for the copolymer systems is improved by ~15% on average in this DNA size range. Interestingly, the presence of the hydrophobic dihexylacrylamide monomer at concentrations up to 0.43 mol % does not seem to adversely affect DNA peak efficiencies; however, the best overall separation is obtained in the LPA-co-DHAs with the smallest amount of dihexylacrylamide, 0.13 mol % (plot 2).

The spiked peak in FIGS. 3A and 3B representing "350" base pairs is split into two separate peaks that are fairly well resolved. This "extra" peak is not present in the LPA matrix and only appears as a shoulder in the other LPA-co-DHA matrixes. The source of this peak is likely an imprecise product of the enzymatic cleavage used to produce this ladder. Plotting migration time vs. DNA size can be used to estimate the size of the spiked peak and the "extra" peak to be 350 and 360 base pairs. The increased resolution in LPA-co-DHA can also be seen by comparing elution time differences between the 50-base pair fragment and the spiked 350-base pair fragment in FIG. 3B. In the LPA-co-DHA matrices there is an additional half-minute in elution time and the 350-base pair fragment elutes at the same relative time as the 550-base pair fragment in LPA. For these shorter DNA fragments, the increase in the robustness of the polymer network is expected to provide enhanced separation via Ogston like sieving. This is an increase in resolution of 40%, i.e., a very significant improvement in the ability to determine accurate DNA sizes in this critical size range for genotyping, which has never before been obtained in linear polymer systems where the acrylamide backbone has been substituted with another monomer.

Figure 2:
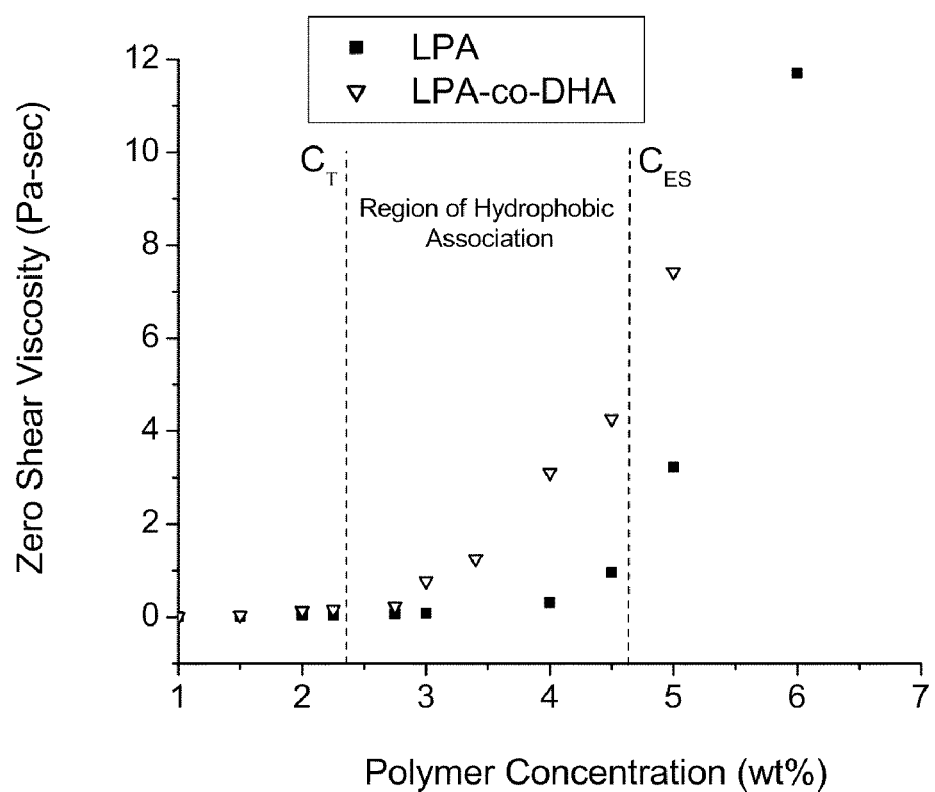
FIG. 2. Comparison of the zero-shear solution viscosities of LPA and LPA-co-dihexylacrylamide networks. The sharp increase in viscosity between 2 wt % and 4.5 wt % for the LPA-co-DHA indicates the region of interchain hydrophobic chain association and also of improved DNA separation performance. Both the copolymer and LPA have weight-average molar masses of 1.3 million g/mol. The LPA-co-DHA polymers contain on average 0.23 mol % dihexylacrylamide.

Interestingly, at concentrations above the hydrophobic entanglement region, near $C_{ES}$ in FIG. 2, the enhanced separation effect is diminished. At $C_T$, the LPA matrix begins to become a truly entangled polymer solution and the extent of network connectivity is similar to that of the LPA-co-DHAs at the same concentration. The separation performance of the two systems (LPA and LPA-co-DHA) should thus become comparable again. At concentrations near $C_{ES}$ the separations are equivalent for approximately the first 400 base pairs (tested with a 50-bp and 100-bp ladder, data not shown) while the separation quality diminishes for DNA sizes greater than 400 bases due to a more constricted polymer network and the onset of biased reptation.

Figure 6:
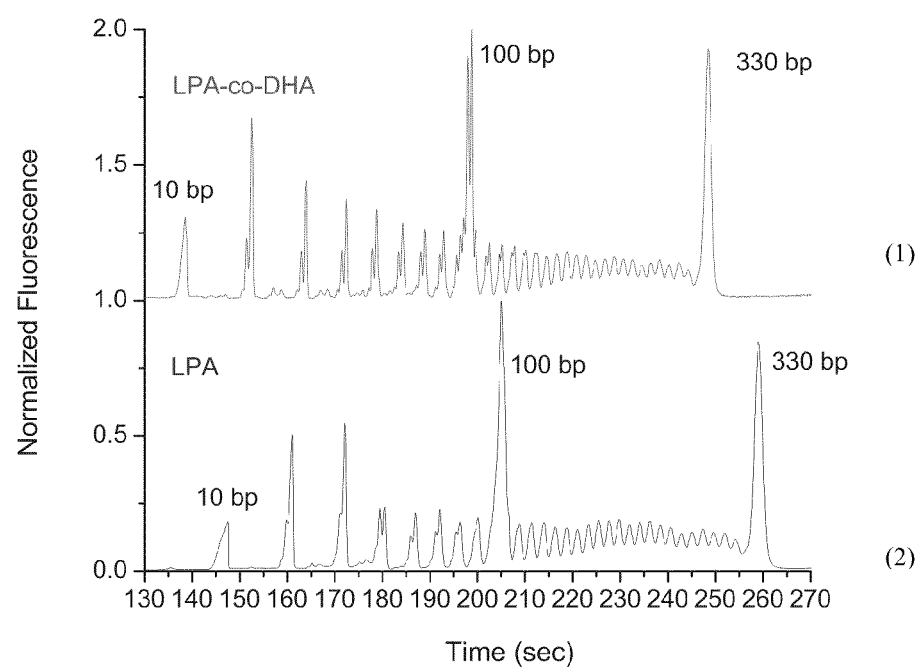
FIG. 6. Microchip electropherogram showing increased separation performance for the analysis of a 10-bp DNA ladder (as indicated by the doublets) of small DNA in a LPA-co-DHA (plot 1) for small fragments of DNA compared to that of unmodified polyacrylamide (plot 2), at polymer concentrations greater than $C_T$.

However, the separation performance is substantially better in the LPA-co-DHAs for DNA with molecular sizes less than 120 base pairs, as shown in FIG. 6. Specifically, FIG. 6 presents two microchip electropherograms showing the separation of a 10-base pair ladder (10 to 330 bases with the 100-bp fragment spiked) separated in 5 wt % LPA or LPA-co-DHAs, both with molar masses ~1.3 million g/mol. Both polymer matrices separate the 10-bp DNA ladder well (providing 1.4 million and 2.8 million plates/meter for DNA peaks in LPA and LPA-co-DHA respectively), and with nearly equal peak spacing. However, the electropherogram for the LPA-co-DHA matrix has extra peaks, seen as doublets, which are not clearly resolved in the LPA homopolymer matrix. Again these extra peaks reveal side products of the enzymatic cleavage procedure and represent a few base-pairs difference in DNA size, demonstrating the additional separation power of the LPA-co-DHA networks for smaller sized DNA, which may be important in applications such as forensic short-tandem repeat (STR) sizing. As many as five or six peaks can be seen for the 90- and 100-base pair fragments in the LPA-co-DHA-based separation, whereas only the one broad peak is seen in the LPA electropherogram. In this concentration range the LPA-co-DHA matrix comprises a more tightly associated network with a smaller average mesh size than the LPA matrix, and hence separates smaller fragments of DNA better. The data shown in FIG. 6 also demonstrate ability to load these matrices, which have high zero-shear viscosities but which also show shear-thinning behavior, into microfluidic devices with small channels. These separations performed in microchips are extremely fast (260 seconds) and are obtained with excellent resolution. (Comparative separations and data are provided in examples 11-14, below.)

Electrophoresis of DNA was done in copolymer solutions with concentrations below the critical value for interchain entanglements, $C_T$. In both the homopolymer and the copolymer networks, DNA molecules are well separated up to ~600 base pairs and no significant differences in peak resolution between separations in LPA vs. LPA-co-DHA networks are seen in this concentration range. However, the migration time of the DNA is monotonically decreased with increasing copolymer hydrophobicity. The increase in speed for more hydrophobic matrices can be attributed to the copolymer chain contraction associated with intramolecular bonding. A copolymer chain in contraction occupies less physical volume and will have a lower frequency of collisions with electromigrating DNA molecules, and hence allow faster DNA migration. A copolymer chain in this state may also be slightly more "effective" at entangling with a DNA molecule during a collision, so that the combination of the two effects gives approximately the same resolution. As discussed below, the present invention, considered more broadly, can provide a novel separation mechanism and/or method(s) useful in conjunction therewith for separation of DNA through LPA-co-DHA networks that are predominantly in the physically crosslinked state, yielding slightly faster separations.

Single-molecule epifluorescent videomicroscopy was used to observe the motion of DNA molecules through the various polymer solutions. Evidence suggesting a unique modality of separation, absent in conventional polymer solutions, is presented in FIG. 7. Image captures from these videos of a single molecule of fluorescently labeled DNA migrating via the two well-known mechanisms of DNA separation, transient entanglement coupling (left) and reptation (upper right panel) are shown for two representative polymer solutions (a 0.3 wt % solution of 1.3 million g/mol LPA, and a 1.8 wt % solution of 1.3 million g/mol LPA). See, Sunada, W.; Blanch, H. *Biotechnology Progress* 1998, 14, 766-772. Barron, A.; Blanch, H.; Soane, D. *Electrophoresis* 1994, 15, 597-615. Sartori, A.; Barbier, V.; Viovy, J. *Electrophoresis* 2003, 24, 421-440. Kantor, R.; Guo, X.; Huff, E.; Schwartz, D. *Biochemical and Biophysical Research Communications* 1999, 258, 102-108. The field strengths were approximately 130 V/cm in each case.

In the first mechanism of separation, transient entanglement coupling, a DNA molecule becomes entangled with dissolved polymer, stretches out to form a characteristic "U" shape oriented in the direction of the electric field, and physically drags the polymer with it until the DNA molecule or polymer chain slides off and discontinues the entanglement. After the collision event the DNA chain contracts back into a globular conformation. Dots were superimposed over the video frame-captures to demonstrate how the entangled DNA-polymer conjugate travels in the direction of the electric field with time.

In the second mechanism of DNA separation, reptation, DNA molecules snake through a highly entangled polymer matrix continuously, in an elongated conformation. Because the average mesh size of the polymer network is much smaller than the DNA coil size, DNA molecules migrate through the network "head-first," and meander their way through the tortuous path of the entangled polymer matrix to travel in the direction of the electric field. Imaging experiments in a chemically crosslinked poly(acrylamide) gel of the prior art (upper-right panel) were conducted as well, and also showed reptation-like DNA chain dynamics. Although reptation has been much discussed in the literature, FIG. 7 presents the first published images of electrophoretically driven DNA reptation through a linear polymer solution.

Figure 7:
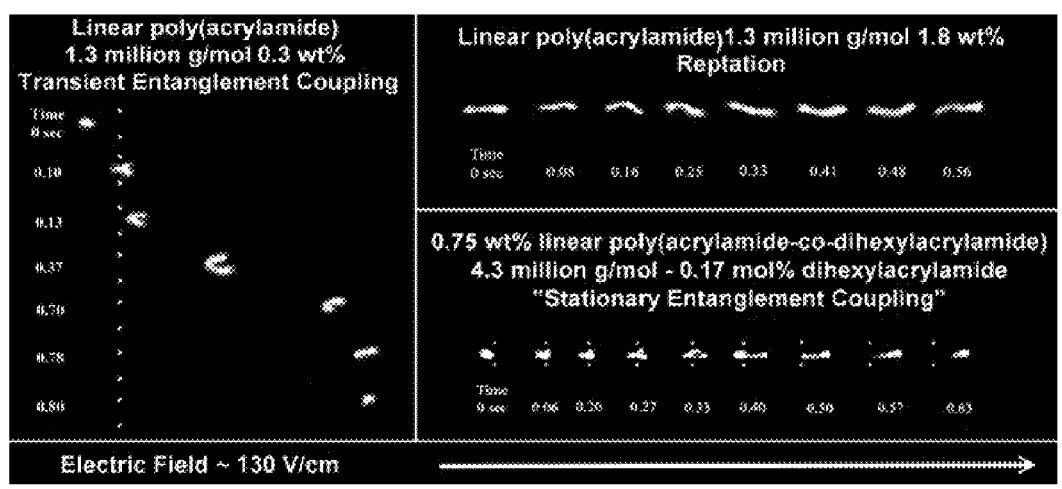
FIG. 7. Single-molecule epifluorescent videomicroscopy electronic still-frame image captures at indicated time points depicting the motion of DNA through 0.3 wt % LPA (left), 1.8 wt % LPA (top), and 0.75 wt % LPA-co-DHA with 0.17 mol % DHA (bottom). Three distinct DNA separation mechanisms can be seen: transient entanglement coupling (left), reptation (top), and the novel stationary entanglement coupling mechanism which resembles an "inchworm" motion (bottom). The applied electric field in each case is ~130 V/cm, and the white dots have been superimposed over the video to act as reference points.

When DNA migration was imaged through LPA-co-DHA solutions, it was discovered that DNA can also migrate through a polymer matrix by a previously undiscovered mechanism which can be referred to as "stationary entanglement coupling." The stationary entanglement coupling migration mode can be seen in FIG. 7 (bottom-right panel) and resembles a DNA collision event with a photolithographically defined insulating post. Dots are superimposed to show the stationary nature of the chain entanglement point (which must be the hydrophobically associated DHA domains). The LPA-co-DHA used for the electrophoresis experiment shown in FIG. 7 shown has an average molar mass of 4.3 million g/mol and comprises just 0.17 mol % dihexylacrylamide. This copolymer was used at a 0.75 wt % polymer concentration, which is within the region of hydrophobic association for this higher molar mass sample. In stationary entanglement coupling, a DNA molecule moves in the direction of the electric field in a globular conformation until it collides with a polymer chain. Both the DNA and (apparently) the polymer chain on which DNA is entangled remain stationary at the collision point, while the two ends of the DNA chain extend and stretch around the polymer to form a characteristic "J" shape. Both sides of the "J"-shaped DNA chain compete in this stretching event and extend away from the collision/entanglement point. The longer side of the "J" eventually wins out and pulls the small end of the DNA around the point of collision. After the DNA molecule disassociates from the polymer obstacle it snaps back into a globular shape. Examining the DNA with real-time videomicroscopy images shows a mode of DNA locomotion very similar to an inchworm or a Slinky™ with many repetitive and dramatic chain stretching and contraction events.

The LPA-co-DHA copolymer network used in FIG. 7 is relatively open with ample spacing between chains as evidenced by these chain dynamics, and the average relaxation time of the polymers (determined by analysis of storage and loss moduli data, not shown) is ~7.9 seconds. For an electric field strength of 130 V/cm, the collision time is on the order of 0.5 seconds and hence the LPA-co-DHA network behaves like a rigid crosslinked structure, which does not allow the DNA to drag the polymer along with it during electrophoresis. The videomicroscopy results therefore provide complimentary evidence to the rheological data to validate the existence of a physically crosslinked polymer architecture.

The separation methods and related mechanisms of this invention can be used in conjunction with all copolymers of the sort described herein. That is, physically crosslinked polymer networks when within a region of hydrophobic association between $C_\eta$ and $C_T$. As the concentration of the copolymer is increased, the average mesh size of the network decreases and the frequency of DNA-polymer collisions increases. At sufficiently high polymer concentrations the DNA begins to experience multiple collision events while stretched, and must wrap around multiple polymer chains to continue moving in the direction of the electric field. As illustrated, the DNA molecules begin to snake through the matrix approaching traditional reptation migration dynamics. Notwithstanding a particular mechanism or mode of operation, the copolymer separation media of this invention can be applied to clinical diagnostics and DNA identity assays, providing high-resolution separations for more precise genetic information, or be applied to provide faster DNA separations on chips in shorter distances thereby effectively reducing the required analysis time.

EXAMPLES OF THE INVENTION

The following non-limiting examples and data illustrate various aspects and features relating to the polymer compounds, compositions, methods and/or device structures of the present invention, including the preparation and use of copolymers and related electrophoretic separation media comprising various monomers and moieties thereof capable of physical cross linking, as described herein. In comparison with the prior art, the present polymers, compositions, media, methods and/or devices provide results and data which are surprising, unexpected and contrary thereto. While the utility of this invention is illustrated through the use of several copolymers, monomeric components/moieties and representative mole percentages thereof, which can be used therewith, it will be understood by those skilled in the art that comparable results are obtainable with various other copolymers and monomers/moieties, over a range of mole percentages, as are commensurate with scope of this invention.

Example 1

The copolymers of this invention can be synthesized via standard free radical solution polymerization methods using aqueous solvent or with a mixture of water and slightly more hydrophobic co-solvent(s). Additionally, a solvent such as dimethylformamide may be used to dissolve all components for polymerization. Using this polymerization method a random copolymer of hydrophilic acrylamide and hydrophobic alkylacrylamide can be prepared as shown below.

Example 1a

Into the solvent dimethylformamide, the following are dissolved: total monomer concentration 3 wt %, 95 mol % acrylamide content, 5 mol % dihexylacrylamide, 200 microliters of isopropanol (chain transfer agent). Nitrogen is bubbled in the solution for at least 30 minutes and then 0.02 grams of 4,4'-Azobis(4-cyanovaleric acid), ACVA are added and polymerization is initiated at 50° C.

Example 1b

Into the solvent dimethylformamide, the following are dissolved: total monomer concentration 0.3 wt %, 95 mol % acrylamide content, 5 mol % dihexylacrylamide, 1 ml of isopropanol (chain transfer agent). Nitrogen is bubbled in the solution for at least 30 minutes and then 0.02 grams of 4,4'-Azobis(4-cyanovaleric acid), ACVA are added and polymerization is initiated at 50° C.

Example 1c

Into the solvent dimethylformamide, the following are dissolved: total monomer concentration 3 wt %, 99 mol % acrylamide content, 1 mol % dihexylacrylamide, 200 microliters of isopropanol (chain transfer agent). Nitrogen is bubbled in the solution for at least 30 minutes and then 0.02 grams of 4,4'-Azobis(4-cyanovaleric acid), ACVA are added and polymerization is initiated at 50° C.

The preceding compounds can be made with less or omission of chain-transfer agent for larger molar mass copolymers or an increased amount of chain transfer agent to create small molar mass copolymers. Polymerization may also be initiated with another free-radical initiator such as V-50, or with ammonium persulfate and TEMED at lower temperatures if desired. The above examples use acrylamide and dihexylacrylamide; however any hydrophilic or hydrophobic monomer of the sort described herein may be substituted for acrylamide and dihexylacrylamide, respectively. The copolymers synthesized by this method can be purified by rotory evaporation with dialysis followed by recovery via freeze drying.

Another useful synthetic method is a technique called "micellar" polymerization. This method is similar to free-radical polymerization and uses two phases: an aqueous phase and hydrophobic nanodomains of micelles Hydrophilic monomers are dissolved in the aqueous phase while micelles provide a hydrophobic phase to dissolve the hydrophobic monomers. This technique follows similar kinetics as free radical polymerization except when a growing polymer chain encounters a micelle. When the macroradical encounters a micelle all of the hydrophobic monomers dissolved within are added to the chain in one block unit. The polymerization then continues to propagate outside of the micelle until a normal termination reaction occurs. The size of the hydrophobic block added, NH, can be tailored by varying the initial molar ratio of hydrophobic monomer to micelle. The relationship for NH using sodium dodecylsulfate as an example micelle forming molecule is given in Equation 1.

$$N_H = \frac{[\text{Dihexylacrylamide}]}{[\text{micelle}]} = \frac{[\text{Dihexylacrylamide}]}{\frac{[SDS] - CMC_{SDS}}{n_{agg}}}$$

$CMC_{SDS}$ is the critical micelle concentration ($9.2*10^{-3}$ mol/liter @ 50° C.) and $n_{agg}$ (60 at 50° C.) is the aggregation number, or number of SDS molecules that comprise one micelle. As provided below, representative poly(acrylamide-co-dihexylacrylamide) copolymers can be prepared using the micellar polymerization technique.

Example 2a (3% total monomer–5% hydrophobe–$N_H$=3). Into water, the following are dissolved: 11 grams of sodium dodecylsulfate, total monomer concentration 3 wt %, 95 mol % acrylamide content, 5 mol % dihexylacrylamide (2.45 grams Acrylamide–0.55 grams dihexylacrylamide), 200 microliters of isopropanol (chain transfer agent). Nitrogen is bubbled in the solution for at least 30 minutes and then 0.02 grams of 4,4'-Azobis(4-cyanovaleric acid), ACVA are added and polymerization is initiated at 50° C.

Example 2b (3% total monomer–5% hydrophobe–$N_H$=5). Into water, the following are dissolved: 6.8 grams of sodium dodecylsulfate, total monomer concentration 3 wt %, 95 mol % acrylamide content, 5 mol % dihexylacrylamide (2.45 grams Acrylamide–0.55 grams dihexylacrylamide), 200 microliters of isopropanol (chain transfer agent). Nitrogen is bubbled in the solution for at least 30 minutes and then 0.02 grams of 4,4'-Azobis(4-cyanovaleric acid), ACVA are added and polymerization is initiated at 50° C.

Example 2c (3% total monomer–5% hydrophobe–$N_H$=8). Into water, the following are dissolved: 4.3 grams of sodium dodecylsulfate, total monomer concentration 3 wt %, 95 mol % acrylamide content, 5 mol % dihexylacrylamide (2.45 grams Acrylamide–0.55 grams dihexylacrylamide), 200 microliters of isopropanol (chain transfer agent). Nitrogen is bubbled in the solution for at least 30 minutes and then 0.02 grams of 4,4'-Azobis(4-cyanovaleric acid), ACVA are added and polymerization is initiated at 50° C.

Example 2d (3% total monomer–1% hydrophobe–$N_H$=5). Into water, the following are dissolved: 1.7 grams of sodium dodecylsulfate, total monomer concentration 0.3 wt %, 95 mol % acrylamide content, 5 mol % dihexylacrylamide (2.9 grams Acrylamide–0.10 grams dihexylacrylamide), 200 microliters of isopropanol (chain transfer agent). Nitrogen is bubbled in the solution for at least 30 minutes and then 0.02 grams of 4,4'-Azobis(4-cyanovaleric acid), ACVA are added and polymerization is initiated at 50° C.

The preceding copolymers can be made with less or omission of chain-transfer agent for larger molar mass copolymers or an increased amount of chain transfer agent to create small molar mass copolymers. Polymerization may also be initiated with another free-radical initiator such as V-50, or with ammonium persulfate and TEMED at lower temperatures if desired. The above examples use acrylamide and dihexylacrylamide; however any hydrophilic or hydrophobic monomer of the sort described herein may be substituted for acrylamide and dihexylacrylamide, respectively. These copolymers can be purified by dialysis, or precipitated from solution with a solvent such as acetone. The precipitated polymer is then recovered mechanically, rinsed with acetone, dried and then placed into dialysis. Freeze drying can be used to recover the copolymer from both methods of purification.

Various monomers, polymers and copolymers of this invention can be synthesized, purified and characterized as described above. For matrices studied, polymer and copolymer molar mass were controlled via the addition of a chain transfer agent to the polymerization (isopropanol). While reference LPAs were made by standard aqueous-phase polymerization of acrylamide in the absence of crosslinker, the LPA-co-DHAs were synthesized by micellar polymerization using SDS. The resultant polymer and copolymer molar masses were analyzed by tandem GPC-MALLS, with a modified mobile phase (33 vol % methanol in water) for the block copolymers.

Example 3

Capillary electrophoresis experiments were conducted with UV detection using a BioRad Biofocus 3000 (BioRad, Hercules, Calif.). Capillaries were 25 cm in length total, with 20-cm effective length and a 75-μm inner diameter. Capillaries were pretreated, on the instrument, with a 2-minute 1 M HCl high-pressure (100 psi) pre-rinse followed by a 2-minute high-pressure rinse of a dilute (0.25 wt %) poly-N-(hydroxyethylacrylamide) coating solution. The capillary was then allowed to rest for 15 minutes to facilitate coating formation, after which the desired separation matrix was loaded into the capillary using 120 psi applied pressure. The applied electric field was 300 V/cm with a typical current of 17 μA during electrophoretic separations.

Example 4

Double-stranded DNA samples were purchased from Invitrogen (San Diego, Calif.) and consisted of 10, 50, and 100 base pair ladders. DNA was diluted to 10 μg/ml in reverse-osmosis purified, deionized water and injected with an applied electric field of 300 V/cm for 7 seconds. For microchip electrophoresis experiments the DNA was stained with 1 μM ethidium bromide.

Example 5

Microchip electrophoresis was carried out using a custom-built laser-induced fluorescence detector. T8050 glass microchips (Micronit, Enschede, The Netherlands) with an 8-cm detection length were adsorptively coated with a dilute poly-N-(hydroxyethylacrylamide) solution for 5 minutes following a 5-minute 1M HCl pretreatment. DNA injection into the offset T of the microchip was accomplished by grounding the sample reservoir and applying a 500 V/cm field to the sample waste reservoir for 30 seconds. The separation field strength was 300 V/cm and pullback conditions were applied to both sample and sample waste to avoid DNA sample leakage into the analysis channel.

Example 6

Single molecules of DNA were visualized using a sensitive high-speed imaging system created especially for observation of DNA electrophoresis under high electric fields, similar to a system previously reported in the literature. See, Carmejane, O. D.; Yamaguchi, Y.; Todorov, T.; Morris, M. *Electrophoresis* 2001, 22, 2433-2441. Yamaguchi, Y.; Todorov, T. I.; Morris, M. D.; Larson, R. G. *Electrophoresis* 2004, 25, 999-1006. Here, a 100-watt mercury lamp light source is directed into a Nikon TE200 inverted epifluorescence microscope. The light is focused and passed through a heat-absorbing filter. The light is filtered via a standard FITC filter cube (Chroma Technology, Brattleboro, Vt.), reflected off a dichroic mirror and focused through a Nikon CFI 100× N.A. 1.4, 0.133 mm working distance apochromatic oil-immersion microscope objective. The collected light is then directed into a VS4-1845 Generation 3 image intensifier (Videoscope International, Dulles, Va.) where it is focused onto a 0.5 inch CCD, TM-6710-CL camera (JAI Pulnix, Sunnyvale, Calif.). This high-speed camera has an adjustable frame rate of up to 120 frames per second at the full resolution of 648×484 pixels. Videos and images are directly captured onto a computer (Dell, 3 GHz processor, 1 Gigabyte of memory) via camera link technology to a PIXCI control board (EPIX INC., Buffalo Grove, Ill.) and the capture is controlled through XCAP-STD (EPIX INC, Buffalo Grove, Ill.) software. Videos were adjusted for brightness and contrast using Adobe Premier 6.5™ and individual frames were exported to Adobe Photoshop 7.0™ for background subtraction and image smoothing.

Example 7

For single-molecule videomicroscopy studies, linearized λ-phage DNA (48.5 kbp, N3011S, New England Biolabs, Ipswich, Mass.) was fluorescently stained with YOYO-1 (Molecular Probes/Invitrogen, San Diego Calif.) replacing TOTO. See, Randal, G. C.; Doyle, P. *Macromolecules* 2005, 38, 2410-2418. Catalase, Glucose Oxidase (Fisher Scientific, Pittsburgh, Pa.) and β-mercaptoethanol (Sigma-Aldrich, St. Louis, Mo.) are added into the solution to reduce the amount of detrimental oxygen and free-radical interactions with DNA when exposed to air and light. See, Yanagida, M.; Morikawa, K.; Hiraoka, Y.; Matsumoto, S.; Uemura, T.; Okada, S. *Applications of Fluorescence in the Biomedical Sciences;* Alan R. Liss, Inc.: New York, 1986. Pipette tips were cut wider with a razor blade to avoid shearing and breaking the DNA. Microchannels used for DNA imaging are composed of a Sylgard 184 poly(dimethylsiloxane) (Fisher Scientific, Pittsburgh, Pa.), or PDMS, top piece and a glass cover slip of thickness number 1.5 (Fisher Scientific, Pittsburgh, Pa.).

Example 8

The PDMS top piece is formed by first mixing PDMS pre-polymer and curing agent at a 10:1 ratio (by weight)

respectively, degassing the mixture and then pouring this mixture on top of thinly cut (1-2 mm) slices of Scotch Magic Tape™ (50-60 µm thickness) or a photolithographically defined SU-8 mold with size (4 cm by 50 µm by 50 µm). After allowing the PDMS to cure in a vacuum chamber overnight it is then cut to fit on a cover slip, peeled off and annealed to the glass cover slips. The stained DNA-polymer solution is then pipetted onto one end of the microchip and allowed to wick into the microchannel by capillary action. Another drop of solution was placed at the other end to serve as a buffer reservoir. The electric field is applied via platinum-tipped electrodes powered by a number of 9-volt batteries connected in series to give the desired electric field.

Example 9

Figure 8:
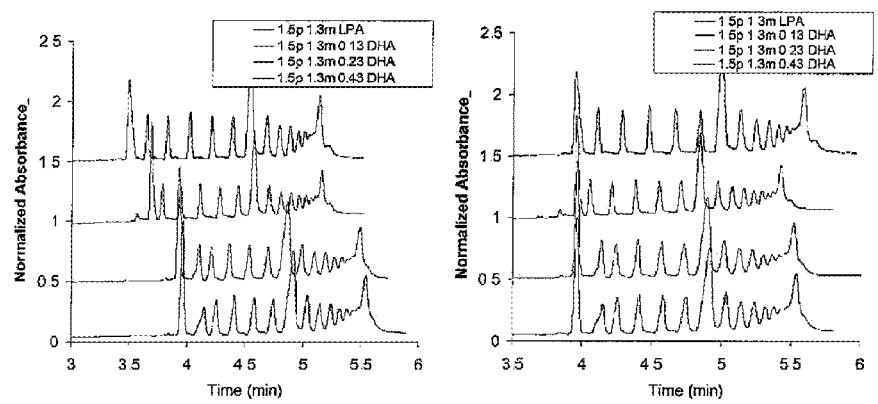
FIG. 8. Electropherograms of DNA through LPA (blue) and LPA-co-DHAs at 1.5 wt % concentration. This concentration is below the critical concentration of hydrophobic association. The LPA-co-dihexylacrylamides shown contain 0.13 mol % (top), 0.23 mol % and 0.43 mol % (bottom). The left frame shows raw migration times and the right frame shows the LPA-co-DHAs time shifted so that the first peaks (50 bp) are aligned to match that of LPA and to ease the visualization of resolution.

Capillary and microchip electrophoresis experiments were performed to demonstrate the effectiveness of physically cross-linked polymer solutions. FIG. 8, below, presents several capillary electropherograms showing DNA migration through polymer and copolymer solutions. In these cases the concentration of polymer is below the intermolecular chain concentration, $C_T$. Both sets of electropherograms shown below have had their signals normalized to the tallest peak and offset vertically for ease of comparison. Displayed in the left panel is the raw data and in the right panel the data has been time-shifted such that the first peak in each trace starts at the same time. The data have been time-shifted to allow easier comparison of the peak resolution. The DNA separated was a 50-base pair ladder (50-800 base pairs by 50-bp increments with 350-bp peak spiked, (Invitrogen, San Diego, Calif.)) with a 300 V/cm applied electric field in TTE buffer (49 mM Tris, 49 mM TAPS, 2 mM EDIA) in a 75 micron inside diameter capillary with a 20 cm effective length. The polymers used in these electropherograms all are dissolved at 1.5 wt % (a concentration below the hydrophobically associating concentration) and all have molar masses of 1.3 million g/mol and are arranged in increasing hydrophobicity starting at the bottom with 0% dihexylacrylamide (first top trace) ending at 0.43 mol % dihexylacrylamide (bottom trace). The polymer with no hydrophobic comonomers (a homopolymer of polyacrylamide) exhibits nearly equal separation performance relative to copolymers with hydrophobic comonomers which are exhibiting intramolecular hydrophobic association as shown in the right panel of FIG. 8. Increasing the hydrophobicity of the copolymer (e.g., including 0.13, 0.23, and 0.43 mol % dihexylacrylamide) decreases the time required for the DNA to elute with essentially no detectable difference in peak resolution. The increased separation speed is a result of the different interactions between DNA and copolymer compared to unmodified acrylamides due to the intramolecular self association of the hydrophobic moieties in the copolymers.

Example 10

Figure 9:
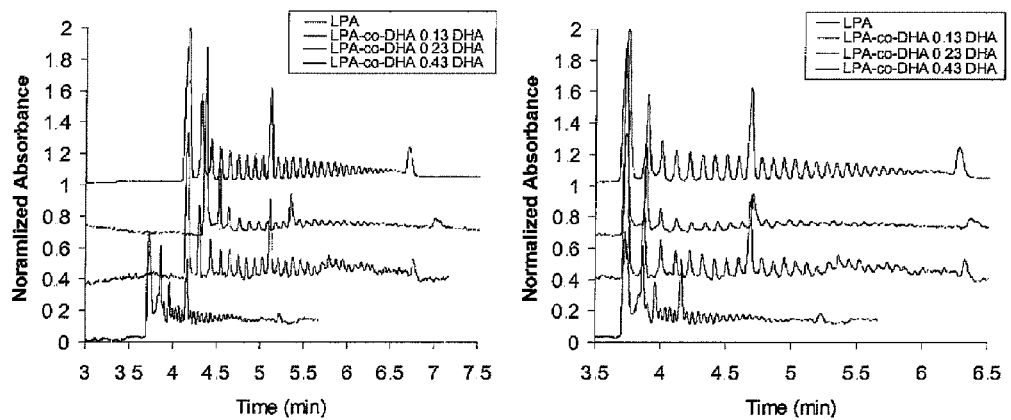
FIG. 9. Separation of a 10-bp DNA ladder within the concentration range of hydrophobic association. All (co)polymers shown are 1.3 million g/mol at 3% polymer concentration. The panel on the left presents raw data and the right panel shows peaks that have been time-shifted to better show resolution. The DNA separation is remarkably better in copolymers that contain DHA compared to LPA. Each peak represents an increment of 10 bases in DNA size. The 100 base pair DNA is spiked in the sample.
Figure 10:
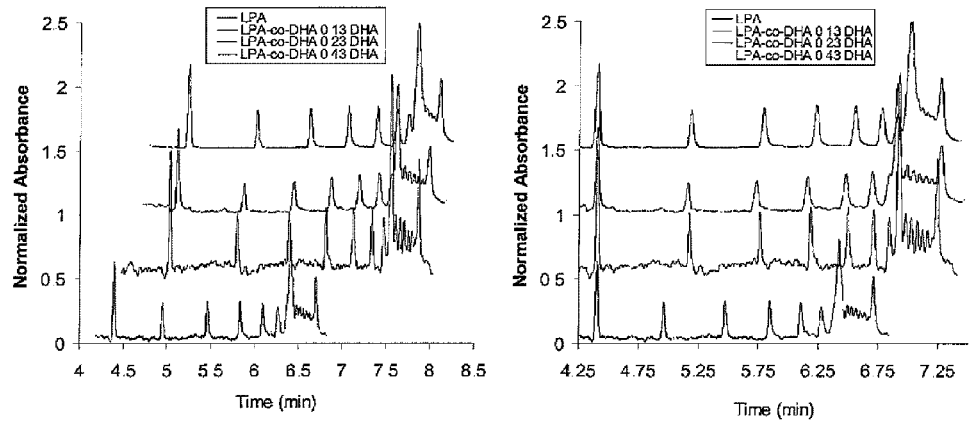
FIG. 10. Separation of a 100-bp DNA ladder within the concentration range of hydrophobic association. All (co)polymers shown are 1.3 million g/mol at 3 wt % polymer concentration. The panel on the left is raw data and the right panel shows peaks that have been time shifted to better show resolution. The DNA separation is remarkably better in copolymers that contain DHA compared to LPA. Each peak represents an increment of 100 bases in DNA size. The 800 base pair DNA is spiked in the sample.

This effect of increased separation performance can be seen over a wide range of DNA sizes and is not just limited to a 50-base pair ladder. Presented below in FIG. 9 is the separation of a 10-base pair ladder which represents a collection of smaller sized DNA from 10 base pairs to 340 base pairs. The left panel shows the raw data, and the light shows the time-shifted data. Results from the unmodified polymer of similar molar mass, LPA, are shown in blue. LPA-co-DHAs have dihexylacrylamide content of 0.13 mol % (second, from top), 0.23 mol % (third), and 0.43 mol % (bottom). The same trend observed for the 50-base pair ladder is seen in this separation as well. Resolution is vastly improved, with near base-line resolution obtained in the LPA-co-DHAs. The improved resolution also holds true for a 100-base pair ladder, as seen in FIG. 10.

Example 11

Figure 11:
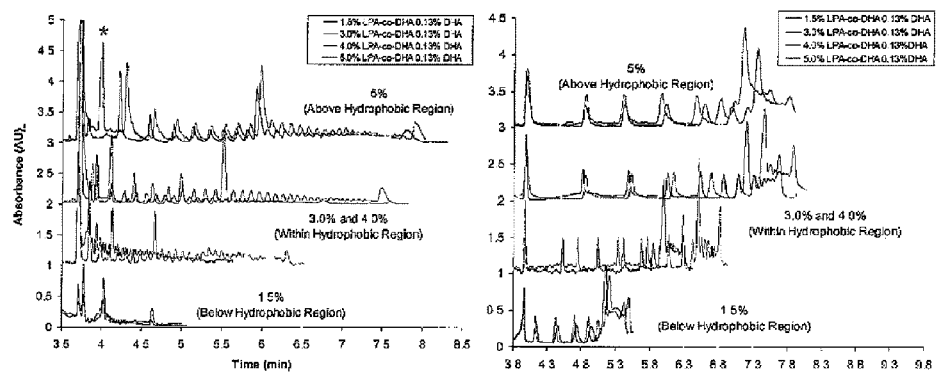
FIG. 11. Electropherograms of 10-base pair ladder separations (left) and 100-base pair ladder separations (right) in increasing concentrations of LPA and LPA-co-DHA, 0.13% DHA. LPAs are shown each, while LPA-co-DHAs are shown, from bottom to top, for 1.5%, 3%, 4%, and 5% wt polymer concentrations. All separations were performed in a 75 μm ID capillary, 20 cm detection length, 300 V/cm. A previously unresolvable peak was able to be separated by a 5% LPA-co-DHA copolymer and is indicated by an asterisk (*).

At concentrations above the hydrophobic entanglement region the enhanced separation effect is diminished. Most likely, the LPA matrix begins to have a polymer architecture more similar to that of the LPA-co-DHA as the concentration is further increased past the region of hydrophobic association and polymer-polymer entanglement interactions dominate. Along those lines, the separation performance of the two systems (LPA and LPA-co-DHA) becomes comparable again at higher concentrations as shown in FIG. 11. Shown in this figure are electropherograms that have been overlaid (equal polymer concentration) on each other and offset based on polymer concentration and time offset to have their first peaks at the same migration time. The unmodified LPA is always shown, in black, while the LPA-co-DHA is polymer concentrations shown are, from bottom, 1.5%, 3%, 4%, and 5% wt. The separations performed here are a 10-base pair ladder (10-330 base pairs by 10, with 100-bp spiked, left frame) and a 100 base pair ladder (100-1500 bp by 100, 800 spiked, right frame). The separation of DNA performed at polymer concentrations below the hydrophobic entanglement region (1.5% polymer) have roughly the same separation performance in LPA and LPA-co-DHA, while separations done at polymer concentrations within the hydrophobic entanglement region have remarkably better separations in LPA-co-DHA compared to LPA. Above the hydrophobic entanglement concentration region the separation power of LPA-co-DHA is approximately the same as that of LPA over a wide range of fragments (40-350 bp) and is better for LPA-co-DHA at very small DNA fragments (30 by and less). This is evidenced by the separation of a previously nonresolvable (by LPA) "10 bp" fragment into two separate peaks with sizes estimated at 9 and 12 base pairs. The "extra" peak has been marked with an asterisk (*).

Example 12

Figure 12:
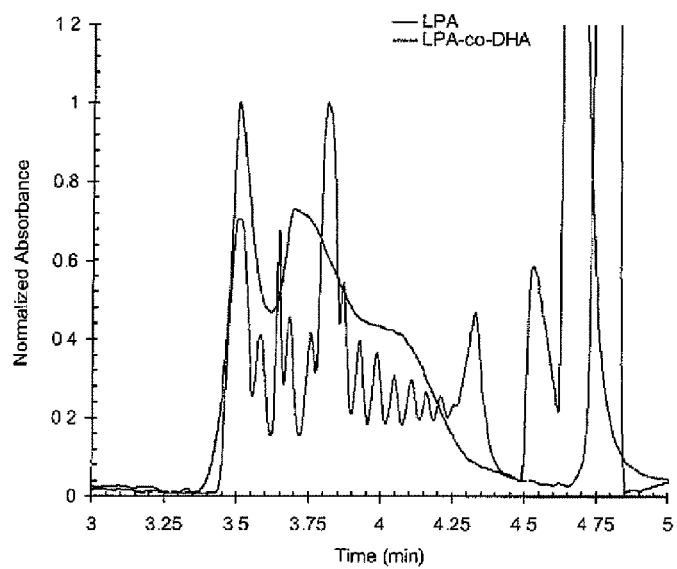
FIG. 12. Electropherograms of a 50-bp DNA ladder separated in 0.5% wt 6.4 million molar mass polymer solutions. The separation in LPA is very poor with no identifiable peaks while the separation performed in LPA-co-DHA is very well resolved with many identifiable peaks. The LPA-co-DHA was time shifted to more easily show resolution differences between the LPA and LPA-co-DHA.

In order to show that the positive effect on DNA separations is seen over a large range of polymer molar masses, electropherograms are presented in FIG. 12 where a 50-bp ladder is separated in 0.5 wt % polymer solutions of 6.4 million g/mol LPA (blue) and LPA-co-DHA with 0.25% DHA (red). The 6.4 million g/mol separation in LPA is very poor with no identifiable peaks (besides the plasmid at the end) while the separation performed in similar molar mass LPA-co-DHA is very well resolved with many identifiable peaks. The 0.5% wt LPA-co-DHA is at a rather low concentration to obtain such a relatively good separation Example 13

DNA sequencing via capillary array electrophoresis has been demonstrated using LPA-co-DHAs with a read length of up to 545-bases in preliminary data using a MegaBACE 1000 and SlimPhredify v 1.5 base caller. The copolymer used was a LPA-co-DHA with molar mass of 1.3 million g/mol and 0.23% mol dihexylacrylamide and 5 mol % hydroxyethylacrylamide dissolved at 3.5% wt in 1×TTE+7M urea buffer. The capillary diameters were 75 microns with an effective length of 40 cm. The separation field strength was 180 V/cm with an electrophoretic injection for 40 seconds at 60 V/cm. The read length obtained (# of DNA bases sequenced) does not represent an optimized copolymer formulation with respect to copolymer molar mass or concentration for DNA sequencing. The read length can improve with further optimization of matrix (copolymer molar mass, concentration, etc.), but does demonstrate that DNA sequencing can be accomplished with little or no adverse effects (e.g., band broadening or peak tailing) on peak shape due to interactions between fluorescent dyes and the hydrophobic dihexylacrylamide within the LPA-co-DHA copolymer. Additionally, a dramatic improvement in DNA sequencing performance can be expected by using matrix blending. Matrix blending can include using a small amount of large molar mass (>1 million g/mol) modified or unmodified copolymer with moderate amounts of low molar mass (≦500,000 g/mol) cellulose, linear acrylamide based polymers, or hydrophobically modified copolymers. An electropherogram showing the 743-base read length was obtained (not shown). Additionally, as was the case with the dsDNA separations presented previously, it has been found that the LPA-co-DHAs have performed consistently better then their LPA counterparts at the same molar mass and concentration.

Example 14

To show the utility of the reversible nature of the physical cross-links and the utility of the shear-thinning behavior, a 2 wt % copolymer solution of 4.3 million g/mol LPA-co-DHA with 0.23 mol % dihexylacrylamide (with 120,000 centiPoise zero-shear viscosity) was loaded into an 8.5 cm long (8 cm effective length) glass microchannel with interior channel dimensions of 50 microns by 20 microns. Without the shear thinning behavior or breakable/reversible nature of the cross-links, this copolymer solution would be extremely difficult if not impossible to load into the microchannel. The subsequent DNA separation of the M13 sequencing standard (Amersham, N.J.) was performed at 50° C. and completed in 220 seconds. In this particular experiment the LPA-co-DHA is above $C_T$ and a less than optimal read length of ~250 bases was obtained. However, results demonstrate the loadability of the copolymers of extremely high viscosities.

Example 15a

With reference to Examples 1 and 2, above, various other copolymers of this invention can be prepared using the synthetic procedures of the sort described therein or straightforward modifications thereof as would be understood by those skilled in the art made aware of this invention. Such copolymers are limited only by available monomeric component starting material, reagents and/or reaction conditions. For instance, with reference to the following table, various other copolymer compounds are prepared using, in any combination, one or more first monomeric component(s) and one or more second monomeric component(s). As illustrated below, by choice of respective N-susbstituent(s), a particular copolymer can be designed and prepared for a particular DNA or RNA separation, with resolution comparable to or enhanced over the prior art. Whether random or block copolymeric, $n_1$ and $n_2$ can be varied depending upon starting material and reaction conditions, desired molar mass and component composition, and can be adjusted to provide effective separation and good resolution with as low as about 0.10 mole percent of second monomeric component(s). While representative $R_1'/R_1''$ and $R_2'/R_2''$ moieties are shown, it will be understood that such moieties include various other homologs and related structural isomers. Representative of such structural isomers, for $C_{12}$ (dodecyl) consider N-(4-butyloctyl), N-(4-isobutyl-6-methylheptyl) and N-(3-isopropyl-2,2,4,4-tetramethylpentan-3-yl) moieties. Such isomeric variations are also contemplated in conjunction with other moieties/substituents of the sort described herein. Likewise, any such moiety can be further substituted (e.g., hydroxy, amino, etc. on a first and/or second monomeric component), such substitution limited only by functional effect of the sort described herein and afforded to the corresponding monomeric component.

| Monomeric Component | N-substituent/moiety |
| --- | --- |
| $\mathrm{{+}CH_2C(R_1)C(O)NR_1'R_1''\mathrm{{+}}_{n1}}$; $R_1'$ and/or $R_1''$: | H, methyl, ethyl, hydroxyethyl, propyl, hydroxypropyl, isopropyl, butyl, hydroxybutyl, etc. |
| $\mathrm{{+}CH_2C(R_2)C(O)NR_2'R_2''\mathrm{{+}}_{n2}}$; $R_2'$ and/or $R_2''$: | H, methyl, ethyl, propyl, pentyl, heptyl, octyl, undecyl, dodecyl, hydroxyhexadecyl, nonadecyl, eicosyl, etc. |

Example 15b

With reference to example 15a and previous discussion regarding copolymer structure, certain copolymer embodiments can be represented as $(X)_{m1}\mathrm{{-}[CH_2C(R_1)C(O)NR_1'R_1''\mathrm{{-}}]_{n1}\mathrm{{-}}(Y)_{m2}\mathrm{{-}[CH_2C(R_2)C(O)NR_2'R_2''\mathrm{{-}}]_{n2}\mathrm{{-}}(Z)_{m3}}}$ where X, Y and Z can be independently selected from one or more other first, hydrophilic and/or second, hydrophobic monomeric components, one or more monomeric components capable of reducing osmotic flow, one or more monomeric components capable of inducing volume phase transition and/or polymer termination moieties of the sort understood and known in the art. Likewise, $m_1$, $m_2$, $m_3$ and $n_1$ and $n_2$ can be integers independently selected to provide a number or range of monomeric components/units randomly or per block, such components and/or number thereof, limited only by desired functional effect, as can be provided using synthetic techniques of the sort provided herein or straightforward modifications thereof, such techniques and/or modifications as would be understood by those skilled in the art made aware of this invention.

We claim:

1. A method of using a linear acrylamide copolymer compound for separation of nucleic acid components, said method comprising:

providing an aqueous medium comprising a linear acrylamide copolymer comprising a first monomeric component of a formula $CH_2C(R_1)C(O)NR_1'R_1''$ wherein $R_1$ is selected from H and methyl moieties; and $R_1'$ and $R_1''$ are independently selected from about H, $C_1$ to about $C_4$ linear alkyl moieties, $C_1$ to about $C_4$ substituted linear alkyl moieties, $C_1$ to about $C_4$ branched alkyl moieties, and $C_1$ to about $C_4$ substituted branched alkyl moieties; and a second monomeric component of a formula $CH_2C(R_2)C(O)NR_2'R_2''$ wherein $R_2$ is selected from H and methyl moieties; and $R_2'$ and $R_2''$ are independently selected from H, $C_1$ to about $C_{24}$ linear alkyl moieties and $C_1$ to about $C_{24}$ branched alkyl moieties, providing at least one of $R_2'$ and $R_2''$ is at least about $C_6$;

introducing said medium to one of a microchannel electrophoresis capillary and a microfluidic sequencing chip; and contacting a mixture comprising at least one of DNA sequence components and RNA sequence components with said medium at an applied voltage and for a time at least partially sufficient for electrophoretic separation of said mixture.

2. The method of claim 1 wherein the molar mass of said copolymer ranges from about 1 million to about 12 million g/mole.

3. The method of claim 2 wherein said copolymer concentration ranges from about 0.1 to about 5.0 wt. %, and said second monomeric component ranges from about 0.1 to about 5.0 mole percent of said copolymer.

4. The method of claim 1 wherein said first monomeric component is acrylamide and said monomeric component is N, N-dihexylacrylamide.

5. The method of claim 4 wherein said second monomeric component ranges from about 0.13 to about 4.3 mole percent; and wherein said copolymer is in an aqueous medium, said copolymer concentration ranging from about 2.5 to about 4.5 wt. %.

6. The method of claim 4 wherein said mixture comprises double-stranded DNA sequence components ranging from about 50 to about 850 base pairs.

7. A method of using a hydrophobic monomeric moiety of a linear acrylamide copolymer to effect nucleic acid separation, said method comprising:

providing an aqueous separation medium comprising a copolymer as used in the method of claim 1, said second monomeric component present at a mole percent at least partially sufficient to provide said second monomeric component hydrophobic character in said medium;

introducing said medium to one of a microchannel electrophoresis capillary and a microfluidic sequencing chip; and contacting a mixture comprising at least one of DNA sequence components and RNA sequence components, said components selected from at least one of single-stranded and double-stranded components, with said medium at an applied voltage and for a time at least partially sufficient for electrophoretic separation of said mixture.

8. The method of claim 7 wherein said copolymer concentration is adjusted for said mixture.

9. The method of claim 8 wherein said copolymer concentration provides a substantially intermolecular physical cross-linking interaction of at least one of said $R_2'$ and $R_2''$ moieties of said second monomeric component.

10. The method of claim 8 wherein said copolymer concentration is less than a concentration providing said intermolecular interaction.

11. The method of claim 10 wherein increasing said second monomeric component mole percent decreases time of said separation.

12. The method of claim 7 wherein said introduction comprises application of shear force pressure to reduce said copolymer viscosity.

13. The method of claim 7 wherein one of said capillary and said chip is treated with a hydroxyethylacrylamide osmotic flow component.

14. The method of claim 13 wherein the said osmotic flow component is a first monomeric component of said copolymer.

* * * * *